US009830523B2

(12) United States Patent
Kim et al.

(10) Patent No.: US 9,830,523 B2
(45) Date of Patent: Nov. 28, 2017

(54) METHOD AND APPARATUS FOR RECOGNIZING OBJECT MATERIAL USING SPATIAL IMAGE AND SPATIAL RADAR INFORMATION (71) Applicant: KOREA INSTITUTE OF SCIENCE AND TECHNOLOGY, Seoul (KR)

(72) Inventors: Jaewon Kim, Seoul (KR); Ig Jae Kim, Seoul (KR); Seung Yeup Hyun, Jeju-si (KR); Se Yun Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 382 days.

(21) Appl. No.: 13/800,272

(22) Filed: Mar. 13, 2013

(65) Prior Publication Data

US 2013/0321620 A1 Dec. 5, 2013

(30) Foreign Application Priority Data

May 31, 2012 (KR) .................. 10-2012-0058816
Nov. 9, 2012 (KR) .................. 10-2012-0126947

(51) Int. Cl.
*H04N 5/30* (2006.01)
*G06K 9/32* (2006.01)
*G01S 7/41* (2006.01)
*G01S 13/86* (2006.01)
*G01S 13/88* (2006.01)

(52) U.S. Cl.
CPC ............ *G06K 9/3241* (2013.01); *G01S 7/411* (2013.01); *G01S 13/867* (2013.01); *G01S 13/88* (2013.01)

(58) Field of Classification Search
USPC ........................................... 348/135
See application file for complete search history.

(56) References Cited

U.S. PATENT DOCUMENTS

| 4,393,712 | A | 7/1983 | Sandhu |
| 6,175,645 | B1 * | 1/2001 | Elyasaf et al. ............... 382/147 |
| 2007/0172113 | A1 | 7/2007 | Sai et al. |
| 2007/0210979 | A1 * | 9/2007 | Shingyoji ............ H01Q 1/3233 343/909 |
| 2007/0211853 | A1 | 9/2007 | Curtis et al. |
| 2008/0079954 | A1 * | 4/2008 | Iwaki et al. ................... 356/614 |
| 2009/0198466 | A1 * | 8/2009 | Kajiki et al. ..................... 702/85 |
| 2009/0219511 | A1 * | 9/2009 | Itsuji .................. G01N 21/3581 356/51 |

(Continued)

FOREIGN PATENT DOCUMENTS

| CN | 1659904 A | 8/2005 |
| CN | 1795467 A | 6/2006 |

(Continued)

OTHER PUBLICATIONS

Japanese Office Action dated May 9, 2014 in counterpart Japanese Patent Application No. JP 2013-106327 (6 pages, in Japanese, with partial English Translation).

(Continued)

*Primary Examiner* — Leron Beck
(74) *Attorney, Agent, or Firm* — NSIP Law (57) ABSTRACT

Provided is a method and apparatus for recognizing material of objects by extracting physical properties of objects in a camera photo based on the combined analysis of information obtained by a camera and a radar unit.

15 Claims, 6 Drawing Sheets

(56) References Cited

U.S. PATENT DOCUMENTS

2009/0279807 A1* 11/2009 Kanamorl et al. ............ 382/274
2013/0038857 A1   2/2013 Funayama et al.

FOREIGN PATENT DOCUMENTS

| | | | |
|---|---|---|---|
| CN | 101025744 | A | 8/2007 |
| JP | 2000-251052 | A | 9/2000 |
| JP | 2002-148165 | A | 5/2002 |
| JP | 2004-170429 | A | 6/2004 |
| JP | 2004-520568 | A | 7/2004 |
| JP | 2005-78464 | A | 3/2005 |
| JP | 2006-220608 | A | 8/2006 |
| JP | 2006-528777 | A | 12/2006 |
| JP | 2007-147406 | A | 6/2007 |
| JP | 2008-82971 | A | 4/2008 |
| JP | 2010-14472 | A | 1/2010 |
| JP | 2011-53197 | A | 3/2011 |
| JP | 2011-220866 | A | 11/2011 |
| KR | 10-0986641 | B1 | 10/2010 |
| WO | WO 02/18920 | A1 | 3/2002 |
| WO | WO 03/094545 | A1 | 11/2003 |
| WO | WO 2004/086291 | A2 | 10/2004 |
| WO | WO 2005/078480 | A1 | 8/2005 |

OTHER PUBLICATIONS

Kazunori, Takada "3D Image Survey and Industry Application" ALMAPS II—Aerial 3D Image Generation Technology, Aero Asahi Corporation Technology Development Team, vol. 32, No. 13 A Monthly Journal of Imaging and Information Technology, Japan, Industry Development Organization, 2000, (9 pages, in Japanese, with English Translation).

Korean Office Action dated Nov. 28, 2013 in counterpart Korean Application No. No. 10-2012-0126947 (7 pages, in Korean, with English language translation).

Chinese Office Action dated Feb. 27, 2015, in Chinese Application No. 201310214419.2 (11 pages in English, 8 pages in Chinese).

Chinese Office Action dated Dec. 9, 2015, in counterpart of Chinese Application No. 201310214419.2 (8 pages, in Chinese).

* cited by examiner

METHOD AND APPARATUS FOR RECOGNIZING OBJECT MATERIAL USING SPATIAL IMAGE AND SPATIAL RADAR INFORMATION

CROSS-REFERENCE TO RELATED PATENT APPLICATION

This application claims the benefits of Korean Patent Application No. 10-2012-0058816, filed on May 31, 2012 and No. 10-2012-0126947, filed on Nov. 9, 2012, in the Korean Intellectual Property Office, the disclosure of which is incorporated herein in its entirety by reference.

BACKGROUND OF THE INVENTION

1. Field of the Invention

The present invention relates to a technology for providing information about objects in a camera scene, and more particularly, to a technology for providing information about materials of objects in a camera photograph.

2. Description of the Related Art

Recently, various types of cameras advanced than conventional cameras capturing two-dimensional photos have been developed. Technologies for capturing three-dimensional information and applying the information to games, or capturing a photo to generate images with different focuses are being developed. In addition, an IT(information technology) technique generate a mirror world or virtual reality space converting the real word to digital data to show realistic images to a user, such as Photo Tourism by Microsoft, Inc., and SketchUp and Google Earth by Google, Inc. In order to generate a three-dimensional mirror world close to the real world at a high resolution, various camera systems such as satellite cameras, depth or range cameras, and camera arrays are being used.

However, information obtained by such cameras is just two-dimensional or three-dimensional color intensity of light reflected from objects in the scene. Information about physical properties (density, dielectric constant, etc.), material, thickness of objects in captured photos may not be recognized by current camera technologies.

SUMMARY OF THE INVENTION

The present invention provides a method and apparatus for recognizing material of objects by extracting physical properties of objects in a camera photo based on the combined analysis of information obtained by a camera and a radar unit.

According to an aspect of the present invention, there is provided an apparatus for recognizing object material, the apparatus including an imaging camera unit for capturing a spatial image including various objects in a space; an exploring radar unit sending an incident wave to the objects, and receiving spatial radar information including a surface reflected wave from a surface of each of the objects and an internal reflected wave from the inside of each of the objects; an information storage unit for storing reference physical property information corresponding to a material of each object; and a material recognition processor recognizing material information of each object by using the reference physical property information stored in the information storage unit, the spatial image provided by the imaging camera unit, and the spatial radar information provided by the exploring radar unit.

The incident wave is one of an electronic wave and a sound wave.

A matching processor matches spatial region corresponding to each other between the spatial image and the spatial radar information.

An object setting unit sets a region of a certain object from among the objects in the spatial image.

The material recognition processor detects the material information including an outer appearance, color, brightness, and reflectivity of each object from the spatial image.

The material recognition processor calculates information about a distance to each of the objects by using a first delay time of the surface reflected wave from the incident wave.

The material recognition processor calculates information about a thickness of each of the objects by using a second delay time between the surface reflected wave and the internal reflected wave.

The material recognition processor detects physical property information of each object by using variations in amplitudes and polarities of the incident wave and the surface reflected wave, and recognizes the material information of the each object by comparing the detected physical property information with the reference physical property information.

According to another aspect of the present invention, there is provided a method of recognizing a material of an object, the method including capturing spatial image including various objects in a space by using an imaging camera unit, and sending an incident wave to the objects and receiving spatial radar information including a surface reflected wave from a surface of each of the objects and an internal reflected wave from the inside of each of the objects by using an exploring radar unit; and recognizing material information of each object by using reference physical property information corresponding to a material of each of the objects, the spatial image provided by the imaging camera unit, and the spatial radar information provided by the exploring radar unit.

The method further includes matching spatial region corresponding to each other between the spatial image and the spatial radar information by a matching process, after the capturing of the spatial image and receiving of the spatial radar information.

The method further includes setting a region of a certain object from among the objects in the spatial image by using an object setting unit, after the capturing of the spatial image and receiving of the spatial radar information.

The recognizing of the material information of each object includes detecting the material information including an outer appearance, color, brightness, and reflectivity of each object from the spatial image.

The recognizing of the material information of each object includes calculating information about a distance to each of the objects by using a first delay time of the surface reflected wave from the incident wave.

The recognizing of the material information of each object includes calculating information about a thickness of each of the objects by using a second delay time between the surface reflected wave and the internal reflected wave.

The recognizing of the material information of each object includes detecting physical property information of each of the objects by using variations in amplitudes and polarities of the incident wave and the surface reflected wave, and recognizing the material information of the each object by comparing the detected physical property information with the reference physical property information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an apparatus for recognizing a material of an object, according to an embodiment of the present invention, will be described in detail with reference to accompanying drawings.

Figure 1:
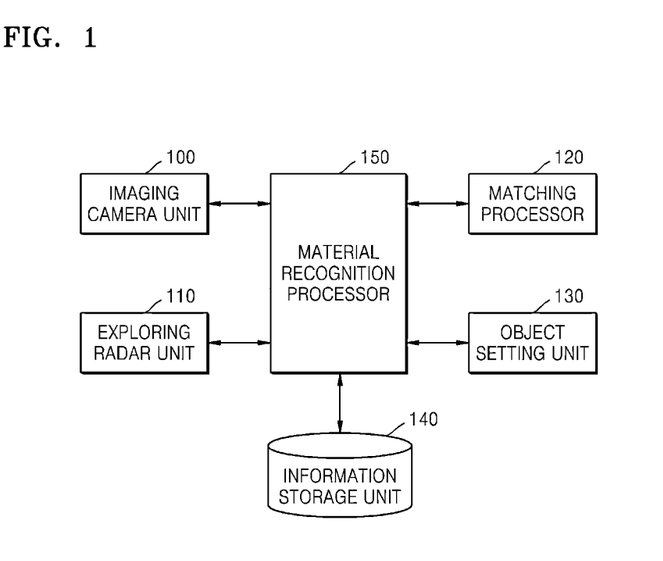
FIG. 1 is a block diagram of an apparatus for recognizing object material, according to an embodiment of the present invention.
Figure 2:
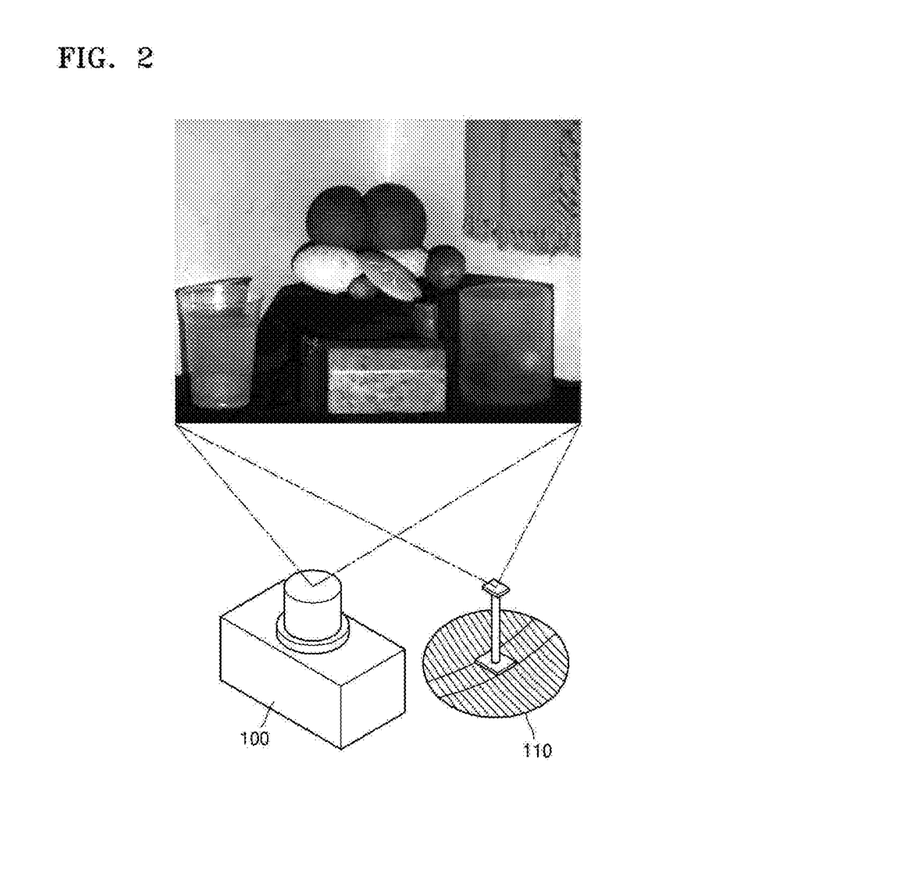
FIG. 2 is a referential diagram for illustrating processes of obtaining information about objects by using an imaging camera unit and an exploring radar unit of FIG. 1.

FIG. 1 is a block diagram of an apparatus for recognizing object material, according to an embodiment of the present invention. The apparatus for recognizing the material of the object includes an imaging camera unit 100, an exploring radar unit 110, a matching processor 120, an object setting unit 130, an information storage unit 140, and a material recognition processor 150. FIG. 2 is an exemplary referential diagram for illustrating processes of obtaining information about objects by using the imaging camera unit 100 and the exploring radar unit 110.

The imaging camera unit 100 captures a spatial image including various objects in the space. As shown in FIG. 2, the imaging camera unit 100 captures an image of a space where various objects of various materials such as plastic, rubber, concrete, marble, wood, glass, etc. are included. The imaging camera unit 100 performs functions of a conventional general camera, and detailed descriptions about the functions are not provided here.

The exploring radar unit 110 irradiates an incident wave to the objects and receives spatial radar information including surface reflected waves from each object and internally reflected waves returning back from the insides of the objects. The exploring radar unit 110 sends electronic waves or sound waves to the objects as the incident wave. In addition, the exploring radar unit 110 includes a transmitter and an antenna for sending the electronic waves or the sound waves, and includes a receiver and an antenna for receiving the reflected waves.

Figure 3:
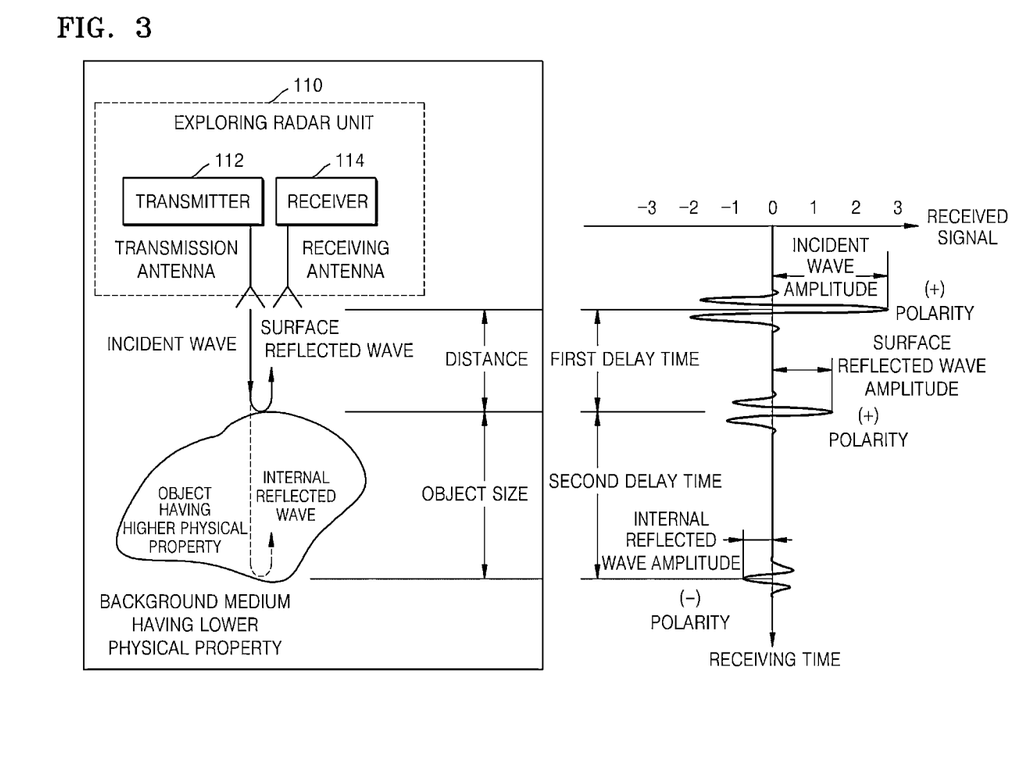
FIG. 3 is a referential diagram for illustrating processes of irradiating incident waves to an object and receiving a surface reflected wave and an internal reflected wave from the object.

FIG. 3 is a referential diagram for illustrating processes of receiving the surface reflected wave and the internally reflected wave from the objects after sending the incident wave to the objects. FIG. 3 illustrates operating principles of the exploring radar unit 110 when the objects have higher physical property than that of a background medium. For example, the background medium is air (atmosphere), and objects may be marble, wood, and rubber.

(1) When incident wave pulse signals generated from a transmitter 112 of the exploring radar unit 110 are incident to the objects via a transmission antenna, the objects having the high physical property reflect the surface reflected waves having less amplitude than and the same phase to those of the incident wave to the exploring radar unit 110. That is, a surface reflected wave corresponds to a reflected wave having the same polarity, that is, positive polarity, to that of the incident wave, and the surface reflected wave having the same phase as that of the incident wave is reflected toward the exploring radar unit 110.

(2) Also, the wave penetrating into the objects from among the incident waves is reflected from the inside of the objects, and the internally reflected wave reflected from the inside of the objects is converted into a wave having negative polarity that is opposite to that of the incident wave and reflected to the exploring radar unit 110.

Accordingly, when the objects have higher physical properties than that of the background medium, the exploring radar unit 110 receives a surface reflected wave having less amplitude and the same polarity compared to the incident wave, and also receives the internal reflected wave having less amplitude and the opposite polarity compared to the incident wave.

Figure 4:
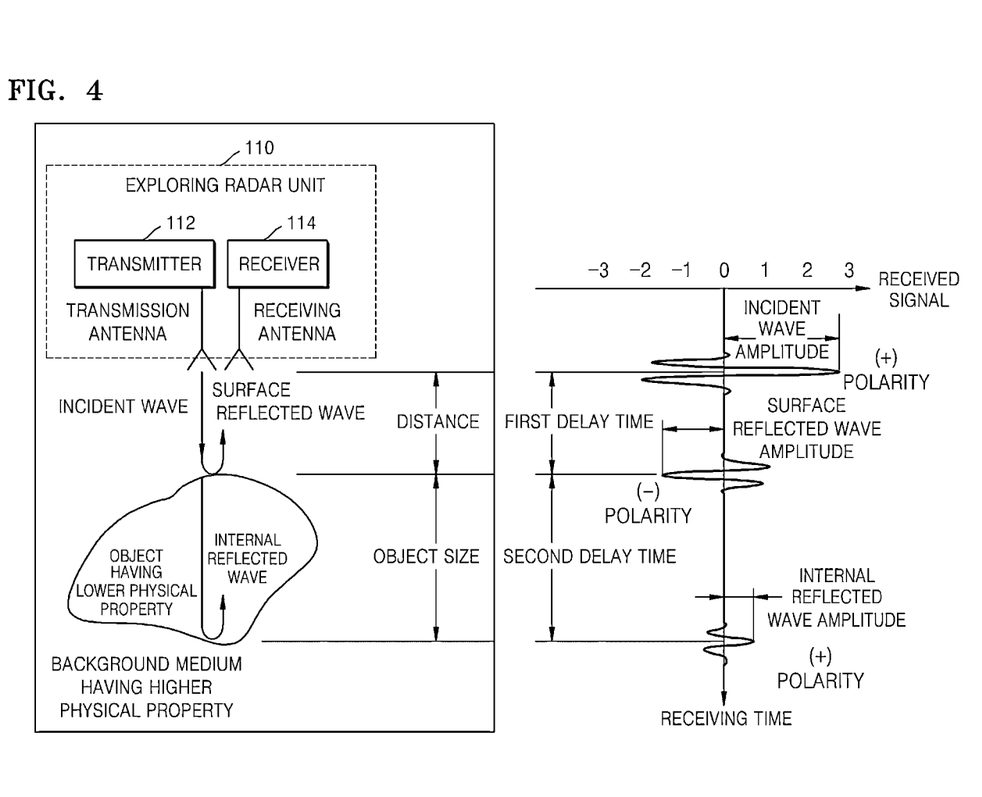
FIG. 4 is a referential diagram for illustrating processes of irradiating incident waves to an object and receiving a surface reflected wave and an internal reflected wave from the object, according to another example of the present invention.

FIG. 4 is a reference diagram for illustrating processes of receiving the surface reflected wave and the internal reflected wave after sending the incident wave to the objects, according to another example. FIG. 4 illustrates operating principles of the exploring radar unit 110 when the objects have lower physical property than that of the background medium.

(1) When the pulse signals of the incident wave generated by the transmitter 112 of the exploring radar unit 110 are incident to the objects via the transmission antenna, which have lower physical property reflect the surface reflected wave having less amplitude than and opposite polarity to that of the incident wave to the exploring radar unit 110. That is, the surface reflected wave at this case is the reflected wave having the negative polarity that is opposite to that of the incident wave and reflected to the exploring radar unit 110.

(2) Also, the wave penetrating into the objects from among the incident waves is reflected from the inside of the objects, and at this time, the internally reflected wave reflected from the inside of the objects is converted into the reflected wave having the positive polarity that is opposite to the surface reflected wave and reflected toward the exploring radar unit 110.

Accordingly, when the objects have the lower physical property than that of the background medium, the exploring radar unit 110 receives the surface reflected wave having the lower amplitude and opposite polarity and receives the internally reflected wave having the lower amplitude and the same polarity with the incident wave.

The matching processor 120 matches spatial region between a spatial image captured by the imaging camera unit 100 and spatial radar information received by the exploring radar unit 110. Even if the imaging camera unit 100 photographs the objects and the exploring radar unit 110 receives the reflected signals after sending the incident wave to the same objects, the imaging camera unit 100 and the exploring radar unit 110 may not operate at the same location since they are spatially separated from each other. Therefore, a region of the spatial image captured by the imaging camera unit 100 and a region of the spatial radar information received by the exploring radar unit 110 do not completely coincide with each other.

Figure 5:
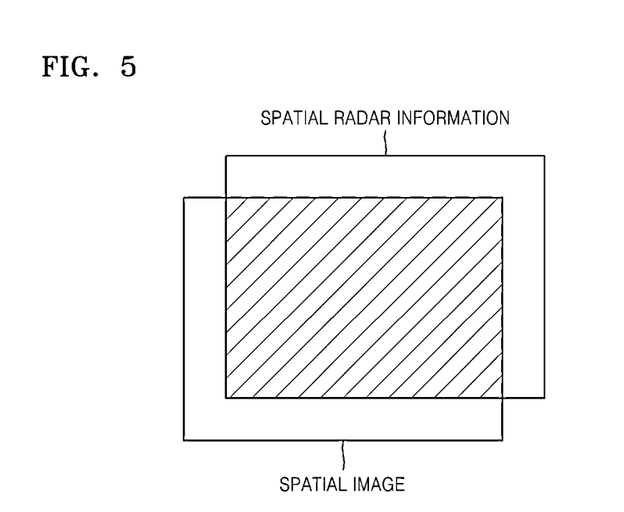
FIG. 5 is a referential diagram for illustrating that a spatial image and spatial radar information do not coincide with each other.

FIG. 5 is a reference diagram for illustrating that the spatial image and the spatial image information do not coincide with each other. As shown in FIG. 5, a region denoted by diagonal lines denotes a region where the spatial image and the spatial radar information match each other. Therefore, the matching processor 120 matches coordinates of a common space between the spatial image and the spatial radar information to each other so that the spatial image and the spatial radar information correspond to each other with respect to the objects included in the common space.

The object setting unit 130 sets a region of a certain object among the objects included in the spatial image. In order to set the region of the certain object, the object setting unit 130 controls two methods: an automatic boundary detection based on object segmentation techniques such as GrabCut and a user-controlled boundary detection.

Figure 6:
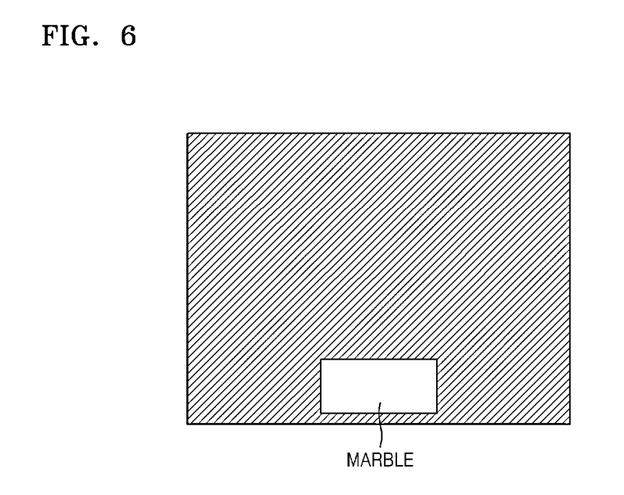
FIG. 6 is a referential diagram showing an example of setting a region of a certain object corresponding to "marble" in the spatial image shown in FIG. 2.

FIG. 6 is a reference diagram showing an example of setting a region of a certain object corresponding to "marble" in the spatial image shown in FIG. 2. As shown in FIG. 6, only a region corresponding to the marble is set by the object setting unit 130, and the other region is processed to black.

The information storage unit 140 stores reference physical property information corresponding to the materials of the objects. Table 1 below is an example of information about the reference physical property corresponding to the materials of the objects.

TABLE 1

|  | Dielectric Constant by EM wave | Surface Acoustic Wave Velocity (Impedance) | Acoustic Wave Velocity (m/s) |
| --- | --- | --- | --- |
| Wood | 1.4 | data not found | 3300-3600 |
| Rubber | 2.15 | 1.74 | 40-150 |
| plastic | 2.3 | 2.94 | data not found |
| Glass | 5 | 14.5 | 3962 |
| marble | 6.25 | 12.4 | 3200-3600 |
| Aluminium | 9-10 | 43.1 | 6420 |
| Water | 76.7 | data not found | 1433 |

As shown in Table 1, the objects have distinguishable physical properties in dielectric constants by EM wave, surface acoustic wave velocities (impedance), and acoustic wave velocities (m/s).

Herein, dielectric constant is a physical unit representing affects of medium between electric charges to an electric field, that is, the dielectric constant is the measure of the resistance that is encountered when forming an electric field in a medium. In addition, the surface acoustic wave velocity denotes a speed of a sound wave propagating along a surface of an object having elasticity. In addition, the acoustic wave velocity denotes a proceeding speed of the sound wave.

The material recognition processor 150 recognizes material information of each of the objects by using the reference physical property information stored in the information storage unit 140, the spatial image of the objects provided by the imaging camera unit 100 and the spatial radar information provided by the exploring radar unit 110.

The material recognition processor 150 detects material information including outer appearances, colors, brightnesses, and reflectivities of the objects from the spatial image captured by the imaging camera unit 100. The captured spatial image includes the color information, brightness information, and the reflectivity information of each object which are principal information for determining the materials of the objects.

Also, the material recognition processor 150 calculates distance information to the objects from a first delay time of the surface reflected wave with respect to the incident wave. For example, if the object setting unit 130 sets the marble as a target object, the material recognition processor 130 identifies a time when the exploring radar unit 110 irradiates the incident wave to the marble, calculates a time for the surface reflected wave to reach the exploring radar unit 110 from a surface of the marble, and then, calculates the first delay time by subtracting the time when the surface reflected wave reaches the exploring radar unit 110 from the time when the incident wave is irradiated. After that, the material recognition processor 150 may calculate the distance to the marble by using the velocity of the incident wave and the first delay time.

Also, the material recognition processor 150 calculates thickness information of each of the objects by using a second delay time between the surface reflected wave and the internal reflected wave. For example, if the object setting unit 130 sets the marble as a target object, the material recognition processor 150 identifies the time when the exploring radar unit 110 irradiates the incident wave to the marble, calculates a time for the internal reflected wave reflected from the inside of the marble to reach the exploring radar unit 110, and calculates a time by subtracting the time when the incident wave is irradiated from the time when the internal reflected wave reaches the exploring radar unit 110. The material recognition processor 150 subtracts the previously calculated first delay time from the above time obtained from subtraction to calculate the second delay time between the surface reflected wave and the internal reflected wave. After that, the material recognition processor 150 may calculate the thickness of the marble by using the incident wave velocity and the second delay time.

Also, the material recognition processor 150 may detect the physical property information of the objects from variations in the amplitude and the polarity between the incident wave and the surface reflected wave, and recognizes the material information of each object by comparing the detected physical property information and the reference physical property information with each other. As shown in FIG. 3, when the incident wave generated by the transmitter 112 of the exploring radar unit 110 is incident to the objects, the objects having higher physical property reflect the surface reflected wave having a less amplitude than that of the incident wave and having the same phase to that of the incident wave to the exploring radar unit 110. When the exploring radar unit 110 receives the surface reflected wave having the less amplitude and the same phase to that of the incident wave, the material recognition processor 150 may detect information representing whether the amplitude and the phase of the received surface reflected wave are changed as the physical property information of the objects. The material recognition processor 150 compares the detected physical property information of the object with the reference physical property information corresponding to the material of each object stored in the information storage unit 140, and thus, detects the reference physical property information corresponding to the received physical property information of the corresponding object. Accordingly, the material recognition processor 150 detects the object corresponding to the reference physical property information that coincides with the physical property information of the corresponding object, and thus, recognizes the object.

According to the apparatus for recognizing the material of the object of the present embodiment, information about the material and the thickness of the object at a point of the object may be obtained. Thus, when the same measuring operation is repeatedly performed while arranging or moving the apparatus in horizontal and vertical directions, accurate information about the material and the thickness of the object may be acquired.

Hereinafter, a method of recognizing object material, according to an embodiment of the present invention, will be described with reference to FIG. 7.

Figure 7:
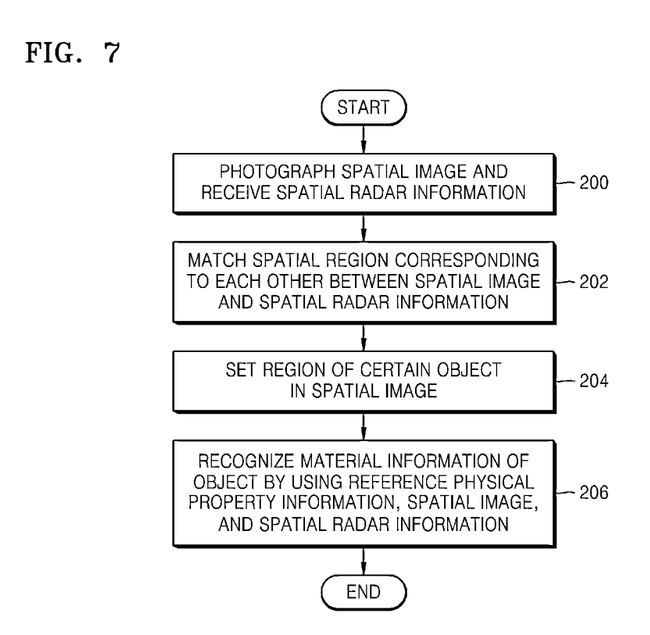
FIG. 7 is a flowchart illustrating a method of recognizing object material, according to an embodiment of the present invention.

FIG. 7 is a flowchart illustrating the method of recognizing object material, according to the embodiment of the present invention.

The imaging camera unit 100 captures spatial image including various objects in a space, and the exploring radar unit 110 sends an incident wave to the objects and receives spatial radar information including surface reflected waves from each of the objects and internal reflected waves returning back from the inside of the objects (operation 200).

As shown in FIG. 2, the imaging camera unit 100 may photograph the space in which there are various objects such as plastic, rubber, concrete, marble, wood, and glass.

As shown in FIG. 3, if the physical property of the object is higher than that of background medium, when the exploring radar unit 110 transmits the incident wave to the object, the object having the higher physical property reflects the surface reflected wave having less amplitude than that of the incident wave and the same phase to that of the incident wave to the exploring radar unit 110, and the exploring radar unit 110 receives the surface reflected wave from the object. Also, the wave penetrating into the object is reflected from the inside of the object, and at this time, the internal reflected wave reflected from the inside of the object is converted into the reflected wave having a negative polarity that is opposite to that of the incident wave and returned to the exploring radar unit 110, and the exploring radar unit 110 receives the internal reflected wave from the inside of the object.

As shown in FIG. 4, otherwise, if the physical property of the object is lower than that of the background medium, when the exploring radar unit 110 transmits the incident wave to the object, the object having the lower physical property reflects the surface reflected wave having less amplitude than that of the incident wave and opposite polarity to that of the incident wave toward the exploring radar unit 110, and the exploring radar unit 110 receives the surface reflected wave from the object. Also, the wave penetrating into the object is reflected from the inside of the object, and at this time, the internal reflected wave reflected from the inside of the object is converted into the reflected wave having the positive polarity that is opposite to that of the surface reflected wave and returned to the exploring radar unit 110, and the exploring radar unit 110 receives the internal reflected wave from the inside of the object.

After operation 200, the matching processor 120 matches spatial regions between the spatial image and the spatial radar information (operation 202). As shown in FIG. 5, since a region of the spatial image captured by the imaging camera unit 100 and a region of the spatial radar information received by the exploring radar unit 110 do not completely coincide with each other, the matching processor 120 matches coordinates of a common space between the spatial image and the spatial radar information to each other, so that the spatial image and the spatial radar information correspond to each other with respect to the objects included in the common space.

After operation 202, the object setting unit 130 sets a region of a certain object from among the objects in the spatial image (operation 204). The object setting unit 130 controls a block forming cursor for setting the region, a block size adjustment cursor, and movement of the cursors. As shown in FIG. 6, only a region corresponding to the marble is set by the object setting unit 130, and the other region is processed to black.

After operation 204, the material recognition processor 150 recognizes material information of each of the objects by using reference physical property information of each object corresponding to the materials of the objects stored in the information storage unit 140, the spatial image provided by the imaging camera unit 100, and the spatial radar information provided by the exploring radar unit 110 (operation 206).

The material recognition processor 150 detects the material information including outer appearances, colors, brightnesses, and reflectivities of the objects from the spatial image captured by the imaging camera unit 100. Such information is principle image information for determining the material of the object.

Also, the material recognition processor 150 calculates distance information to the objects from a first delay time of the surface reflected wave with respect to the incident wave. The material recognition processor 150 identifies a time when the exploring radar unit 110 irradiates the incident wave to the object, calculates a time for the surface reflected wave to reach the exploring radar unit 110 from a surface of the object, and then, calculates the first delay time by subtracting the time when the surface reflected wave reaches the exploring radar unit 110 from the time when the incident wave is sended. After that, the material recognition processor 150 may calculate the distance to the object by using the velocity of the incident wave and the first delay time.

Also, the material recognition processor 150 calculates thickness information of each of the objects by using a second delay time between the surface reflected wave and the internal reflected wave. The material recognition processor 150 identifies the time when the exploring radar unit 110 irradiates the incident wave to the object, calculates a time for the internal reflected wave reflected from the inside of the object to reach the exploring radar unit 110, and calculates a time by subtracting the time when the incident wave is irradiated from the time when the internal reflected wave reaches the exploring radar unit 110. The material recognition processor 150 subtracts the previously calculated first delay time from the above time obtained from subtraction to calculate the second delay time between the surface reflected wave and the internal reflected wave. After that, the material recognition processor 150 may calculate the thickness of the object by using the incident wave velocity and the second delay time.

Also, the material recognition processor 150 may detect the physical property information of the objects from variations in the amplitude and the polarity between the incident wave and the surface reflected wave, and recognizes the material information of each object by comparing the detected physical property information and the reference physical property information with each other. As shown in FIG. 3, when the exploring radar unit 110 receives the surface reflected wave having the less amplitude and the same phase to that of the incident wave, the material recognition processor 150 may detect information representing whether the amplitude and the phase of the received surface reflected wave are changed as the physical property information of the objects. The material recognition processor 150 compares the detected physical property information of the object with the reference physical property information corresponding to the material of each object stored in the information storage unit 140, and thus, detects the reference physical property information corresponding to the received physical property information of the corresponding object. Accordingly, the material recognition processor 150 detects the object corresponding to the reference physical property information that coincides with the physical property information of the corresponding object, and thus, recognizes the object.

According to the present invention, information about the physical property, material, and thickness of the objects included in the image captured by the camera may be obtained together. Therefore, by acquiring material information of the objects, the information may be essentially used to make avatars of users interact actively in a mirror world or a virtual reality space. For example, in order to describe transformation of an object realistically when an avatar applies force to the object in the mirror world, the information about the material, physical property, and thickness of the object is necessary, and thus, the present invention provides the material information to make virtual reality more realistic.

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for recognizing object material, the apparatus comprising:
   an imaging camera unit configured to capture a visual image of an object;
   an exploring radar unit configured to:
      send an incident wave to the object, and
      receive reflections of the incident wave, the reflections comprising a surface reflected wave from a surface of the object and an internal reflected wave from inside the object;
   a storage unit configured to store reference physical property information corresponding to one or more materials; and
   a material recognition processor configured to:
      detect a first physical property information of the object based on at least one of an outer appearance, a color, a brightness, or a reflectivity of the object in the visual image,
      detect a second physical property information of the object based on a comparison of a polarity of the incident wave to at least one of a polarity of the surface reflected wave or a polarity of the internal reflected wave, and
      recognize a material of the object based on a comparison of the reference physical property information to the first physical property information and the second physical property information.

2. The apparatus of claim 1, wherein the incident wave is one of an electronic wave and a sound wave.

3. The apparatus of claim 1, further comprising a matching processor configured to match a spatial region of the visual image to a corresponding spatial region of the reflections.

4. The apparatus of claim 1, further comprising an object setting unit configured to set a region of the visual image corresponding to the object in the visual image.

5. The apparatus of claim 1, wherein the material recognition processor is further configured to recognize the material based on material information comprising the outer appearance, the color, the brightness, and the reflectivity.

6. The apparatus of claim 1, wherein the material recognition processor is further configured to calculate distance information to the object based on a delay time of the surface reflected wave with respect to the incident wave.

7. The apparatus of claim 1, wherein the material recognition processor is further configured to calculate thickness information of the object based on a delay time of the surface reflected wave with respect to the internal reflected wave.

8. The apparatus of claim 1, wherein the material recognition processor is further configured to detect the second physical property information of the object based on variations in amplitude and the polarity of the surface reflected wave with respect to the incident wave.

9. A method of recognizing object material, the method comprising:
   capturing a visual image using an imaging camera unit, the visual image comprising an object;
   sending an incident wave to the object and receiving reflections of the incident wave, the reflections comprising a surface reflected wave from a surface of the object and an internal reflected wave from inside the object, using an exploring radar unit;
   detecting a first physical property information of the object based on at least one of an outer appearance, a color, a brightness, or a reflectivity of the object in the visual image;
   detecting a second physical property information of the object based on a comparison of a polarity of the incident wave to at least one of a polarity of the surface reflected wave or a polarity of the internal reflected wave; and
   recognizing a material of the object based on a comparison of the reference physical property information to the first physical property information and the second physical property information.

10. The method of claim 9, further comprising matching a spatial region of the visual image to a corresponding spatial region of the reflections.

11. The method of claim 9, further comprising setting a region of the visual image corresponding to the object in the visual image using an object setting unit.

12. The method of claim 9, wherein the recognizing of the material information of the object comprises recognizing the material based on material information comprising the outer appearance, the color, the brightness, and the reflectivity of the object.

13. The method of claim 9, wherein the recognizing of the material information of the object comprises calculating distance information to the object based on a delay time of the surface reflected wave with respect to the incident wave.

14. The method of claim 9, wherein the recognizing of the material information of the object comprises calculating thickness information of the object based on a delay time of the surface reflected wave with respect to the internal reflected wave.

15. The method of claim 9, wherein the recognizing of the material of the object comprises detecting the second physical property information of the object based on variations in amplitude and the polarity of the surface reflected wave with respect to the incident wave.

* * * * *